Oct. 25, 1932.  L. A. HYLAND  1,884,707
BEACON SYSTEM
Filed Dec. 30, 1929  2 Sheets-Sheet 1
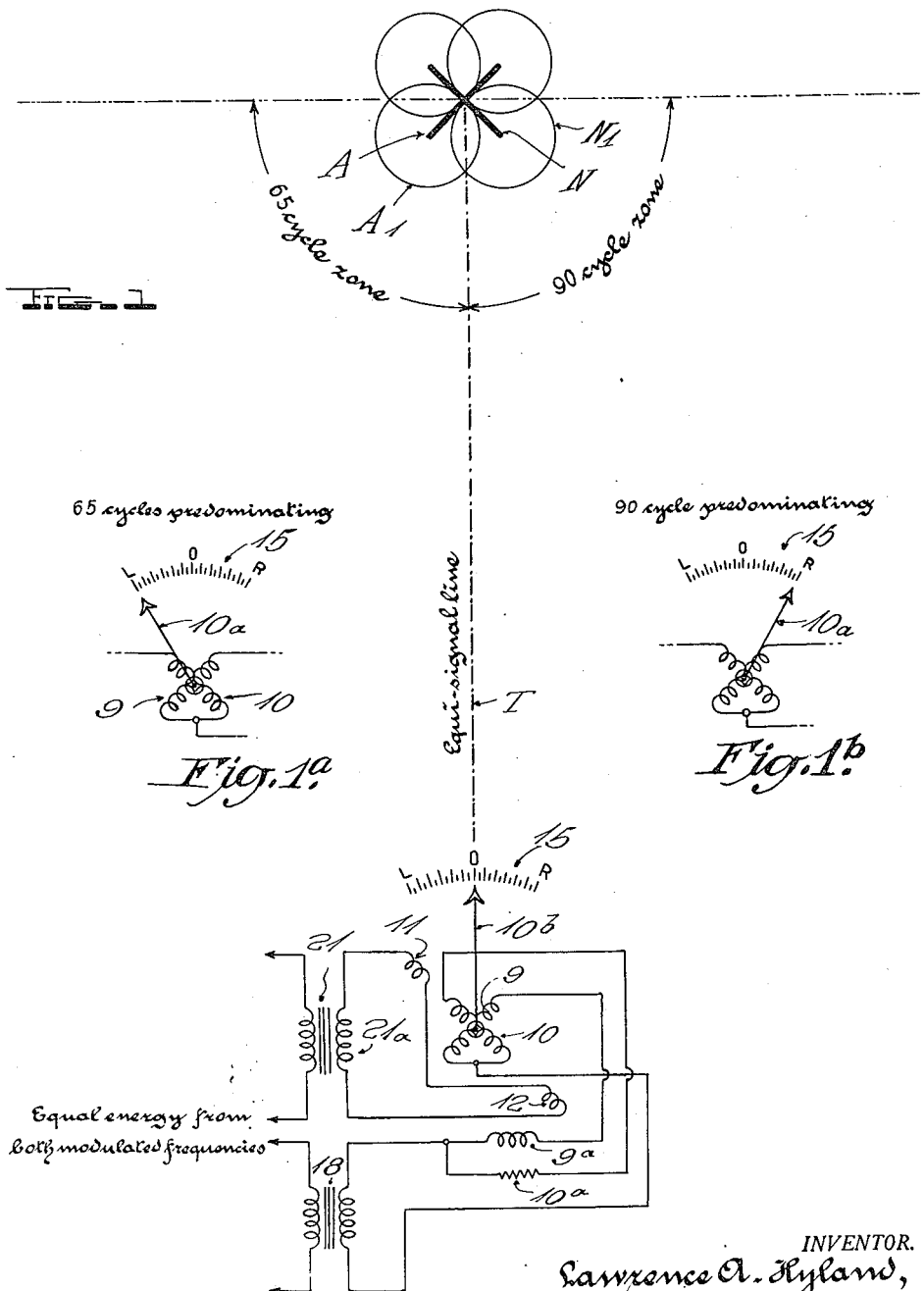
INVENTOR.
Lawrence A. Hyland,
BY Harold Todd.
ATTORNEY.

Oct. 25, 1932.　　　　L. A. HYLAND　　　　1,884,707
BEACON SYSTEM
Filed Dec. 30, 1929　　　2 Sheets-Sheet 2
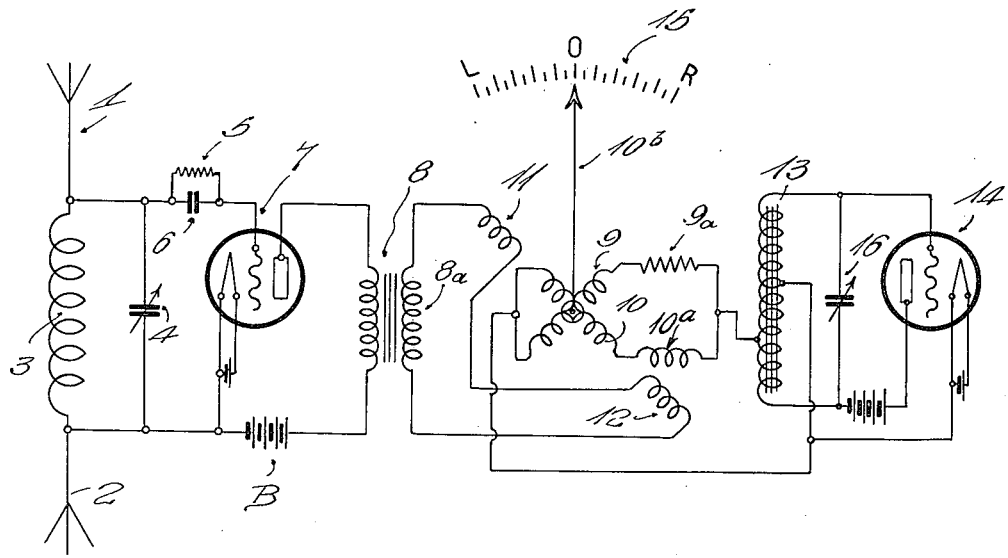
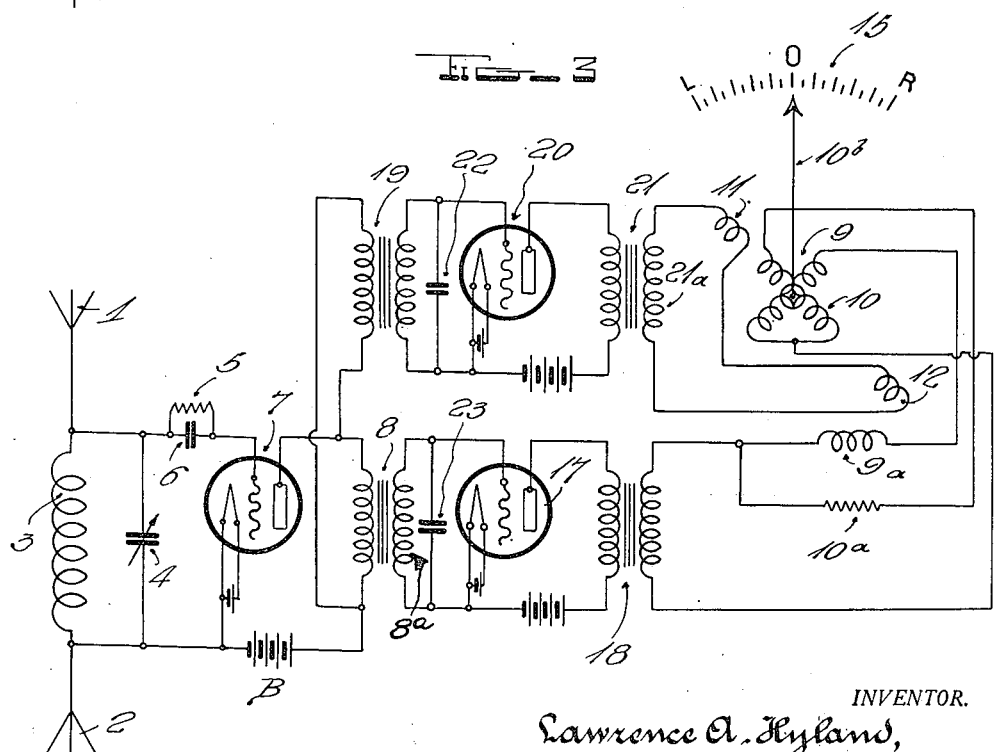
INVENTOR.
Lawrence A. Hyland,
BY
Harold Todd.
ATTORNEY.

Patented Oct. 25, 1932

1,884,707

UNITED STATES PATENT OFFICE

LAWRENCE A. HYLAND, OF WASHINGTON, DISTRICT OF COLUMBIA, ASSIGNOR TO WIRED RADIO, INC., OF NEW YORK, N. Y., A CORPORATION OF DELAWARE

BEACON SYSTEM

Application filed December 30, 1929. Serial No. 417,520.

My invention relates broadly to beacon systems for the guiding of air craft according to a predetermined course of radio frequency energy and more particularly to a circuit arrangement for an indicating apparatus for use in beacon systems for air craft guiding.

One of the objects of my invention is to provide a beacon system for indicating the direction of flight of air craft according to a transmitted beam of radio frequency energy.

Another object of my invention is to provide a beacon receiving system of increased sensitivity in which an indicator may be operated with relatively small signaling current incident upon the pick-up system carried by the air craft.

A further object of my invention is to provide an indicator for operation in a beacon receiver aboard air craft in which an indicator mechanism is normally maintained in a predetermined position by the operation of an oscillator circuit, and the indicator moved in either direction to its normal position by combining the effect of the incoming signaling current with the oscillator in the receiving circuit.

Other and further objects of my invention reside in a circuit arrangement for an indicating system for operation in a beacon receiver as set forth more fully in the specification following by reference to the accompanying drawings, wherein:

Figure 1 diagrammatically illustrates a beacon transmission and reception system employing the principles of my invention showing the indicator maintained in an intermediate position on the indicating scale by operation of the local oscillator circuit when the aircraft is flying on the equi-signal line; Fig. 1a shows the position of the indicator when the aircraft is flying to the left of the equi-signal line; Fig. 1b shows the position of the indicator when the aircraft is flying to the right of the equi-signal line; Fig. 2 illustrates one arrangement of beacon receiver embodying my invention; and Fig. 3 shows a modified circuit arrangement for a beacon receiver embodying the principles of my invention.

In beacon transmission and reception systems for the guiding of air craft, signaling energy is transmitted on crossed loops from a beacon transmitting system generally located at an air craft landing field. The signaling energy from one loop is modulated at some audio frequency, usually 65 cycles, while that from the other loop is modulated at another frequency, or about 90 cycles. The modulated signals are transmitted simultaneously from the loops, so that at some point remote from a transmitter an air craft equipped to receive the transmitted energy will receive the energy modulated at one or the other or both audio frequencies depending upon the relative position of the air craft with respect to the beacon transmitter. The present indicators which are of the reed type vibrate in proportion to the energy received from the transmitter loop to which the reed is tuned. A relatively large amount of energy is necessary to operate the reeds and a receiver having a high degree of sensitivity is normally required. There are disadvantages associated with the use of the vibrating reed method, among which may be mentioned the difficulty of observing the relative vibratory movement of the reeds and the problems associated with the use of highly sensitive receivers on air craft.

In the system of my invention, I employ an indicator, wherein an indicating arm sweeps over a scale moving from a normal intermediate position either to the right or left depending upon the location of the air craft with respect to the predetermined course to the landing field or with respect to the equi-signal line of propagated signal energy. I provide sets of moving coils to energize from a local audio frequency oscillator connected to the movable indicator, which coils are located within the field of the driving coils which exert a torque on the movable coils depending upon the frequency of the incoming signaling energy. That is to say, when the receiving circuits respond to transmitted energy modulated at one audio note, the movable coils will tend to rotate in one direction from normal position, while when the movable coils are subjected to the field of exciting energy modulated at a different frequency, the movable coils will tend to shift in the opposite direction.

When the signaling energy incident upon the receiving circuit has equal strength at both the modulated frequencies, the indicator will tend to remain in normal position thus showing that the air craft is operating upon the equi-signal line. When the air craft shifts or is off the equi-signal line, one modulating frequency or the other will predominate and correspondingly move the indicator either to the right or left depending upon the predominating frequency.

In Figure 1 of the drawings, I have illustrated the crossed coils at A and N which emit high frequency energy directionally in paths at right angles with respect to each other according to the characteristic curves designated at $A_1$ and $N_1$ at modulation frequencies of 65 cycles and 90 cycles, respectively. The equi-signal line is designated by reference character T. Three positions of the receiving indicator carried aboard the air craft have been illustrated, the central position being the normal position for the indicator, the left position (Fig. 1a) showing the indicator shifted on the scale to the left with the 65 cycle frequency predominating, and the right position (Fig. 1b) with the 90 cycle frequency predominating.

Figure 2 illustrates the circuit arrangement for the beacon receiver wherein reference character 1 designates an antenna connected to an inductance 3, the other end of which connects to a counter-poise system 2. The oscillatory circuit including inductance 3 is tuned by condenser 4 and the energy impressed upon electron discharge device 7 connected as a detector including grid condenser 6 and grid leak 5 in the grid circuit thereof. The output circuit of the detector 7 includes a primary winding of audio frequency transformer 8 and source of potential B. The high frequency signaling energy incident upon antenna 1 is rectified by means of detector 7 and delivered as audio frequency impulses at the output terminals of the secondary winding 8a of the audio frequency transformer 8. The indicator employed in the beam receiver of my invention is arranged in the nature of a synchroscope. The synchroscope includes two fixed windings 11 and 12 disposed diametrically opposite each other and connected in series with secondary winding 8a. These coils are traversed by the two audio frequencies corresponding to the modulation frequencies at the transmitter where antenna A operates at a modulation frequency of 65 cycles and antenna N operates at a modulation frequency of 90 cycles. The synchroscope circuit includes an electron tube 14 having its input and output circuits coupled through inductance 13 shunted by means of condenser 16, the circuit thus functioning as an audio frequency oscillator. The oscillator is adjusted to operate at 77½ cycles, and the oscillations at this frequency are impressed through phase splitters 9a and 10a across the movable coils 9 and 10 of the synchroscope. The indicator 10b is arranged to move with the rotation of movable coils 9 and 10 and operates over a scale 15 for indicating the predominating frequency supplied to the synchroscope. When the energy of coils 11 and 12 comprises equal amounts of energy of 65 cycle and 90 cycle frequency, there will be two rotating fields created in the synchroscope of equal and opposite intensity. Hence, the pointer 10b will remain in the zero position of scale 15. If, however, the 65 cycle energy should predominate as will be the case when the air craft is off to the left of the course, the rotating field of the 65 cycle frequency will be greater than that of the 90 cycle frequency, and hence the pointer will be deflected toward the side of the scale corresponding to the 65 cycle frequency as illustrated in Fig. 1a. When, however, the 90 cycle frequency predominates the turning torque in the first direction will exert upon the moving coils 9 and 10 by virtue of the reaction of the 90 cycle frequency with the 77½ cycle frequency of the local oscillator 14 and the indicator will move to the right to a position as illustrated in Fig. 1b.

In Fig. 3, I have shown a beacon receiver system in which the local oscillator 14 is replaced by a constantly operating transmitter on the ground wherein the transmitter is modulated at 77½ cycles. The signal receiving circuit in Fig. 3 thus constantly receives the 77½ cycle modulated energy and directionally receives the 65 cycle and 90 cycle modulated energy according to the direction of flight of the air craft. At the receiver, I provide separate branches leading from the output circuit of detector tube 7. One branch includes audio frequency transformer 8 having a secondary winding 8a thereof connected to amplifier tube 17 whose output circuit connects through audio frequency transformer 18 with the movable coils 9 and 10 through the phase splitters 9a and 10a. The branch circuit which connects to the fixed coils 11 and 12 extends from the output circuit of detector 7 through audio frequency transformer 19 to the input circuit of amplifier 20 having audio frequency transformer 21 disposed in the output circuit thereof with the secondary 21a thereof connected in series with windings 11 and 12. The audio frequency amplifier branches of the beacon receivers are tuned to respond to different audio notes by means of fixed condensers 22 and 23, so that energy of different frequencies is supplied to synchroscope windings 11 and 12 and rotatable windings 9 and 10 by which turning torque is produced for moving indicator 10b. The phase splitters at 9a and 10a serve to introduce the energy into rotatable coils 9 and 10 in such phase relation with respect to the energy of windings 11 and 12 as to produce the necessary turning torque on windings 9 and 10 within the synchroscope.

While I have described my invention in certain of its preferred embodiments, I desire that it be understood that modifications may be made and that no limitations upon my invention are intended other than are imposed by the scope of the appended claims.

What I claim as new and desire to secure by Letters Patent of the United States is as follows:

1. In a beacon system for air craft navigation, a receiving circuit responsive to audio frequency modulations of selected frequencies, said receiving circuit including a pair of diametrically disposed energizing windings each subjected to the incoming signal modulations, an indicating scale, an indicator movable from a central position on said scale toward either end thereof, a pair of movable coils connected to said indicator and positioned between said energizing windings, and a local oscillator connected to said movable coils for establishing an electromagnetic field for normally maintaining said indicator in a central position on indicating scale and operating differentially with respect to the field established by said windings for correspondingly controlling the movement of said indicator toward either end of said indicating scale.

2. In a beacon system for air craft navigation, a signal receiving circuit adapted to receive transmitted energy at separated frequencies, an indicating mechanism connected with said signal receiving circuit, said mechanism including an indicating scale, an indicator arm movable over said scale, a pair of coils rotatably mounted to operate said indicator arm, a local oscillator connected in circuit with said pair of coils, phase splitting means disposed between said local oscillator and said pairs of coils, said oscillator establishing a field for normally maintaining said indicator arm in a central position on said scale and windings disposed on opposite sides of said rotatable coils for establishing a magnetic field differentially acting upon said rotatable coils in accordance with the received transmitted frequency for shifting the position of said indicator arm toward either end of said scale.

3. In a beacon system for aicraft navigation, a signal receiving circuit responsive to emitted energy of different frequencies, an indicating mechanism including an indicating scale, an arm movable over said scale, a pair of coils connected to said arm, a local oscillator connected with said pair of coils, and windings disposed on opposite sides of said pair of coils and arranged to be energized by the energy delivered by said signal receiving circuit, said local oscillator having a frequency related to the incoming signaling frequencies for producing a turning torque in either direction upon said coils for shifting said arm from a central position on said indicating scale toward either end thereof.

4. In a beacon system for air craft navigation, a signal receiving circuit responsive to separated emitted frequencies, an indicating mechanism connected with said signal receiving circuit, said mechanism including an arm angularly movable in either direction from a central position over a scale, a pair of rotatable coils carried by said arm, a local oscillator connected to said pair of rotatable coils, and a pair of windings disposed on diametrically opposite sides of said pair of rotatable coils and connected in series for energization at the incoming emitted frequencies for establishing a magnetic field differentially acting with respect to the magnetic field established in said rotatable coils for shifting said indicator arm to the left or right over said scale, said oscillator operating to normally maintain said arm in a central position over said scale.

5. In a beacon system for air craft navigation, a signal receiving circuit responsive to different emitted frequencies, an indicator mechanism including an indicating scale calibrated from a central position toward opposite ends thereof, an indicator arm movable over said scale, a pair of rotatable coils carried by said arm, a local oscillator for energizing said coils individually in different phase relation, and windings disposed on opposite sides of said rotatable coils and energized by said signal receiving circuit at different emitted frequencies, the frequency of said oscillator being chosen to excite said rotatable coils in predetermined phase relation for the production of a turning torque upon said coils in either direction depending upon the frequency of the incoming energy, said oscillator normally establishing an electromagnetic field for maintaining said arm in a central position with respect to said scale independently of the incoming signaling energy.

6. In a beacon system for air craft navigation, a circuit for receiving directed emitted energy modulated at different audio frequencies, an indicating scale calibrated from a central postion toward opposite ends thereof, an oscillator, an indicator movable over said scale from said central position toward either end thereof, and a rotatable mechanism for driving said indicator, said mechanism operating to combine the effects of said oscillator and the effects of the modulated emitted energy in said receiving circuit for moving said indicator in either direction over said scale from a central position, said oscillator normally operating to maintain said indicator in a central position.

7. In a beacon system for air craft navigation, a circuit for receiving emitted energy directively transmitted and modulated at different audio notes, an indicator mechanism including an indicating scale calibrated from a central position toward opposite ends thereof, an indicator movable over said scale from said central position toward either end thereof, a pair of rotatable windings and a pair of fixed windings, said fixed windings being connected in series and excited by emitted energy received by said circuit, said rotatable windings being disposed within the field of said fixed windings, and an oscillator for energizing said rotatable windings for normally maintaining said indicator in said central position and producing a turning torque in said indicator mechanism in either of two directions dependent upon the frequency difference between said oscillator and the frequency of the predominating received energy for shifting said indicator toward either end of said indicating scale.

8. In a beacon system for air craft navigation, a receiving circuit responsive to emitted energy directionally transmitted and modulated at different audio frequencies, an indicating scale calibrated from a central position toward opposite ends thereof, an indicator movable over said scale from said central position toward either end thereof, an oscillator having a frequency related to the frequency of the received energy, and connections between said oscillator and said receiving circuit for differential operation of said indicating mechanism by the combined effects of the energy delivered by said oscillator and the energy received at different audio frequencies for producing a differential movement of said indicator in either of two directions depending upon the frequency of the predominating energy received by said circuit while maintaining said indicator in said central position when the modulated energy at both frequencies is equal or absent.

9. In a beacon system for air craft navigation, a receiving circuit responsive to emitted energy transmitted directionally and modulated at different audio frequency notes, an indicating scale calibrated from a central position toward opposite ends thereof, an indicator movable over said scale from said central position toward either end thereof, an oscillator related in frequency to each of the modulating frequencies, said indicating mechanism including a pair of stationary windings and a pair of movable windings, said stationary windings being energized from said receiving circuit and said movable windings being energized from said oscillator, the field of said stationary windings normally tending to maintain said movable windings in a predetermined position when the energies of the different modulated frequencies received in said circuit are equal for locating said indicator in said central position while producing a turning torque for angularly shifting said movable windings in either of two positions from said predetermined position depending upon the differential action by the one or the other of the received modulated energy and the energy delivered by said oscillator.

10. In a beacon system for aircraft navigation, a radio receiving circuit carried aboard aircraft and responsive to signaling energy emitted in adjacent zones and modulated at different audio frequencies, an indicating apparatus carried aboard the aircraft including an indicating scale calibrated from a central position toward opposite ends thereof, a movable indicator normally biased in the central position on said scale, an oscillation circuit for maintaining said indicator in said central position, and signal receiving circuits connected with said oscillation circuit and responsive to the different modulated audio frequencies received in either of said zones on either side of an equi-signal line for shifting said indicator from said central position toward either end of said indicating scale while coacting with said oscillator for maintaining said indicator in the central position of said scale when the different modulated signals are received with equal intensity when the aircraft is on said equi-signal line.

LAWRENCE A. HYLAND.